United States Patent
Guillotel

(10) Patent No.: US 6,480,540 B1
(45) Date of Patent: Nov. 12, 2002

(54) METHOD OF IMAGE COMPRESSION AND DEVICE FOR IMPLEMENTING THIS METHOD

(76) Inventor: Philippe Guillotel, 60 rue de Châteaubriant F-35770, Vern sur Seiche (FR)

(*) Notice: Subject to any disclaimer, the term of this patent is extended or adjusted under 35 U.S.C. 154(b) by 0 days.

(21) Appl. No.: 09/396,570

(22) Filed: Sep. 15, 1999

(30) Foreign Application Priority Data

Sep. 15, 1998 (FR) .......................... 98 11495

(51) Int. Cl.⁷ .............................. H04N 7/12
(52) U.S. Cl. ................................ 375/240.03
(58) Field of Search ................. 375/240.02, 240.03, 375/240.12, 240.13; 348/404.1, 405.1, 419.1; 382/236, 238, 239, 251; H04N 7/12

(56) References Cited

U.S. PATENT DOCUMENTS 5,694,171 A * 12/1997 Katto .................... 348/405

FOREIGN PATENT DOCUMENTS

| EP | 0597647 A2 | * 5/1994 | .......... H04N/7/133 |
| EP | 0705041 A2 | * 4/1996 | ............ H04N/7/50 |
| EP | 0737014 A2 | * 10/1996 | ............ H04N/7/26 |
| EP | 0762778 A2 | * 3/1997 | ............ H04N/7/52 |

OTHER PUBLICATIONS

French Search Report (3 Sheets) dated Jun. 3, 1999.*
Fan, J. et al., "Adaptive Image Sequence Coding Based on Global and Local Compensability Analysis", Optical Engineering, vol. 35, No. 10, Oct. 1, 1996, pp. 2838–2843.*
Lee, J. et al., "Rate–Distortion Optimized Frame Type Selection for MPEG Encoding", IEEE Transactions On Circuits And Systems For Video Technology, vol. 7, No. 3, Jun. 1, 1997, pp. 501–510.*
Lee, J. et al., "Temporally Adaptive Motion Interpolation Exploiting Temporal Masking in Visual Perception" IEEE Transactions On Image Processing, vol. 3, No. 5, Sep. 1, 1994, pp. 513–526.*

* cited by examiner

Primary Examiner—Nhon Diep
(74) Attorney, Agent, or Firm—Joseph S. Tripoli; Ronald H. Kurdyla; Vincent E. Duffy

(57) ABSTRACT

The invention relates to a method of image compression, especially of the MPEG2 type, in which the images are coded according to groups (GOPs) each of which comprises N images, with an I image coded in intra mode, P images predicted as a function of the intra image I or of the preceding P image, each P image being preceded and followed by n bidirectionally predicted B images, n possibly being zero. The number M=n+1 represents the structure of the group. At least one parameter characterizing the source images which are to be coded according to a group is determined using a test coding (70), and the numbers N and M are made to depend on this parameter or these parameters. In the course of the test coding, defined values are conferred on N, M, and on the quantisation interval Q.

20 Claims, 3 Drawing Sheets

METHOD OF IMAGE COMPRESSION AND DEVICE FOR IMPLEMENTING THIS METHOD

FIELD OF THE INVENTION

The invention relates to a method of image compression in which the images are coded according to groups of variable lengths.

It relates more particularly to a method of the MPEG type, particularly of MPEG2 type. Although the invention is not limited to this standard, it will be referred to primarily in the remainder of the description.

BACKGROUND OF THE INVENTION

The principle of such compression is reiterated below.

In the video MPEG2 standard, compression of the digital video signals is obtained by exploiting the spatial redundancy and the temporal redundancy of the coded images.

The spatial redundancy is evaluated principally by virtue of a succession of three operations: an operation commonly called discrete cosine transform and denoted DCT ("Discrete Cosine Transform"), an operation of quantisation of the coefficients arising from the DCT and an operation of variable-length coding to describe the quantified coefficients arising from the DCT.

The temporal redundancy is analysed by a movement-compensation operation which consists, by translation of each block of the current image, in searching for the most similar block situated in the reference image. The analysis of the temporal redundancy leads to a field of translation vectors being determined, commonly called movement vectors, as well as a prediction error which is the difference between the signal of the current image and the signal of the image predicted by movement compensation. The prediction error is then analysed according to the principle of spatial redundancy.

MPEG coding is of predictive type. It follows that the decoding which is associated with it should be regularly reinitialised so as to protect the signal against any transmission error or any break in signal due to the decoder being switched over from one programme to another.

To this end, the MPEG2 standard provides that, periodically, the images should be coded in spatial mode, that is to say according to a mode exploiting only spatial redundancy. The images coded in spatial mode are called INTRA images or I images.

The images coded by exploiting temporal redundancy are of two types: on the one hand, the images constructed by reference to a temporally previous image on the basis of a front prediction and, on the other hand, the images constructed by reference to two temporally previous and subsequent images on the basis of a front prediction and of a back prediction.

The coded images constructed on the basis of a front prediction are called predicted images or P images and the coded images constructed on the basis of a front and of a back prediction are called bidirectional images or B images.

An I image is decoded without reference being made to images other than itself. A P image is decoded by referring to the P or I image which precedes it. A B image is decoded by relying on the I or B image which precedes it and on the I or P image which follows it.

The periodicity of the I images defines a group of images widely denoted GOP ("Group Of Pictures").

Within a single GOP, the quantity of data contained in an I image is generally greater than the quantity of data contained in a P image and the quantity of data contained in the P image is generally greater than the quantity of data contained in a P image.

At 50 Hertz, the GOP is presented as an I image followed by a sequence of B and P images which, most of the time, exhibits the following sequence

I, B, B, P, B, B, P, B, B, P, B, B.

However, the standard does not demand N=12 images being provided in a GOP, as is the general case, nor that the distances M between two P images should always be equal to 3. More precisely, the distance M is the number n of B images preceding or following a P image, increased by one unit, i.e. M=N+1.

The number N represents the size or length of the GOP, while the number M represents its structure.

SUMMARY OF THE INVENTION

The invention results from the observation that it is possible to act on the M and N parameters to enhance the level of compression and/or enhance the quality of the coding.

The method of coding according to the invention is characterised in that at least one parameter is determined characterising the source images which are to be coded according to a group and in that the length and the structure of the group is made to depend on this parameter or these parameters.

In one embodiment, the parameter(s) characterising the source images is or are determined with the aid of a test coding in the course of which defined values are allocated to N, M and to the quantisation interval Q.

The test coding is carried out, for example, in open loop.

In one particularly simple embodiment, a parameter (Pcost) characterising the P images obtained during the test coding and a parameter (Bcost) characterising the B images obtained during the test coding are determined separately, these parameters characterising the P and B images being, preferably, the average costs of coding of the P and B images. The cost of coding an image is the number of bits (headers included) which is necessary for the coding.

In this case, the number N can be made to depend on the parameter characterising the P images and the number M on the parameter characterising the B images.

During trials carried out in the context of the invention, on sequences of images of various types, it was noted that, for each type of sequence, an optimal number N existed providing a minimum coding cost (or throughput) for the P images and an optimal number M providing a minimum coding cost (or throughput) for the B images, these costs being obtained during the test coding. These sequences are distinguished from another by movement of variable amplitudes, different objects, different spatial definitions and different contents.

It was noted, moreover, that a practically linear relationship exists between the optimal number N and the throughput of the P images. Likewise, a practically linear relationship exists between the number M and the throughput of the B images. Hence, knowing the throughputs of the P and B images, it is easy to calculate the numbers N and M providing the best results.

In an example corresponding to the MPEG2 standard, 50 Hz, the test coding is carried out with N=12, M=3 and Q=15, the relationship between N and the throughput of the P images is approximately as follows:

$$N = \text{INT}\left[\frac{389000 - P\text{cost}}{10000}\right] + 1, \text{ with } 12 \le N \le 30 \quad (1)$$

and the relationship between M and the throughput, or cost, Bcost of the B images is as follows:

$$N = \text{INT}\left[\frac{179000 - B\text{cost}}{20000}\right] + 1, \text{ with } 1 \le M \le 7. \quad (2)$$

It is also possible to limit M to 5.

In these formulae, INT signifies the integer part.

The limitation on N between 12 and 30 and the limitation on M to a maximum value of 7 makes it possible to have a simple embodiment of the coders and to limit the programme-changing time. With the same aim, it is also possible to impose other limitations or constraints, particularly that M be constant in the GOP and/or that it be a sub-multiple of N.

In one embodiment, if the values of N and of M taken individually and together are not compatible with the constraints, the values of M and of N closest to the calculated values and which satisfy the stipulated compatibility will be chosen. In this case, the value of M will be favoured, that is to say that if a choice has to be made between several M, N pairs, the pair will be chosen for which the M value is closest to that which results from the calculation.

The formula (2) above applies only if Bcost does not exceed 179800. In the opposite case, that is to say if Bcost>179000, experiment has shown that it was necessary, in this example, for M to be chosen in the following way:

$$M = 5.\text{INT}\left[\frac{P\text{cost}}{B\text{cost}} - 1\right], \text{ with } 1 \le M \le 7. \quad (3)$$

If the cost of a B image is higher than the cost of a P image, it is preferable for the GOP to contain no B image, that is to say M=1. This is because the P images, exhibiting a better prediction quality than the B images and being, by assumption, of lower cost, the presence of such B images would constitute a drawback in this case.

The costs, in bits, of each P image and of each B image are determined, for example, as and when these images appear. In one embodiment, the values of M and N are selected by taking an average over all the P and B images of the test coding, the coding proper being carried out only after the test coding of N source images, N being determined by the cost of coding the P images. In this case, the parameter M may remain constant in the GOP.

In another embodiment, which allows a more rapid adaptation to the variations in content of the scenes as well as a reduction in the delay between the arrival of the source images and coding proper (and which thus allows a lower-capacity buffer memory), the coding proper is started as soon as the test coding supplies data allowing this starting. Hence, the first B image of the test coding provides an M number allowing the coding to be started and the N number is supplied by the first P image of the test coding. It is also possible to have the coding start only after the test coding of the first P image; in this case, the coding starts when a value of N and a value of M are known.

With this type of coding "on the fly", the number M, that is to say the structure, may vary within a GOP, which allows a more rapid adaptation to the variations in content of the scene.

In the coding carried out progressively, the GOP is interrupted when the number of images already coded in the current GOP is at least equal to the measured number N (measured by Pcost in the above example), or upon a change of scene.

In order to avoid significant variations in the parameters between groups which follow one another, it may prove to be worthwhile to depart from the calculated values. For example, if the calculation shows that, for a large part of the length of the GOP, for example at least 80%, M=1 would be necessary, whereas, for the rest of the GOP the calculation shows that M should be greater than 1, the value 1 will be adopted for M, despite everything, even if the calculation shows that a different value is necessary.

Likewise, if for the preceding GOP, M=1 and if, for the current GOP, the calculation shows that a value M=1 would be necessary for a significant part of the current GOP, for example at least 60%, the value 1 will also be adopted for M, even if the result of the calculation, as it results from the formula (2) above, implies a different value.

It is known that when a change of scene occurs, that is to say when a discontinuity appears in the sequence of video images, it is necessary to adapt the GOP image groups on either side of the discontinuity so that the new group, which starts with an I image, corresponds to the new scene.

In one embodiment, if the change of scene occurs in a group, the new scene constitutes the I image of a new group, the affected group being shortened so as to stop before this new scene if the change of scene occurs in the affected group, at a distance from the start at least equal to the minimum number allowable for N. The start of the affected group is used to lengthen the group which precedes it when the sum of the number of images preceding the change of scene in the affected group and of the number of images of the group which precedes it does not exceed the maximum admissible for N. In this preceding group thus modified (shortened or lengthened), it may be necessary to modify the number M previously calculated for this GOP.

In one variant, which is used for preference in the case in which the length of the affected group is less than the minimum allowable for N, when a change of scene occurs in a group, the new scene constitutes the I image of a new group, this new group having a length equal to the average of the length of the group before it was affected and the length of the group which precedes it. With this variant, it may be necessary to modify the number M previously calibrated for the GOPs.

When two modifications are possible, for example when the length of the affected group is less than the minimum allowable for N, a choice may be made between these two modifications by carrying out a calculation, for each modification, of the distance of the (M, N) pair obtained or M, N pair before modification and by selecting the pair for which the distance is the smallest.

In order to determine the parameters N and M, recourse may be had to the measurement of parameters other than the measurement of the throughputs. For example, used may be made, in order to determine N, of the energy of the I Intra images. It is also possible to determine the amplitude of the movements or the movement compensation error, known as DFD (Displaced Frame Difference) for determining M and N.

BRIEF DESCRIPTION OF THE DRAWINGS

Other characteristics and advantages of the invention will emerge with the description of some of its embodiments, this description being given by referring to the attached drawings, in which.

DETAILED DESCRIPTION OF THE PREFERRED EMBODIMENTS

Figure 1:
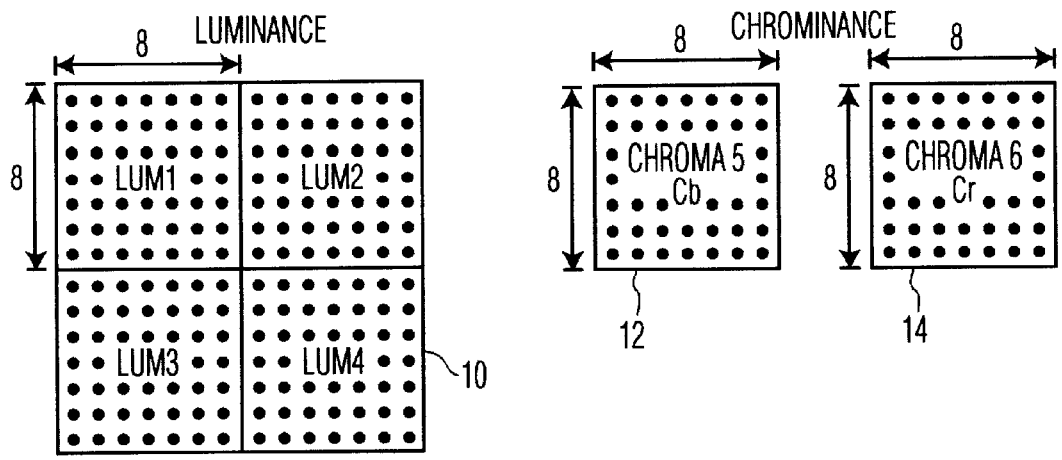
FIG. 1 illustrates a macroblock to the 4.2.0 standard.
Figure 2:
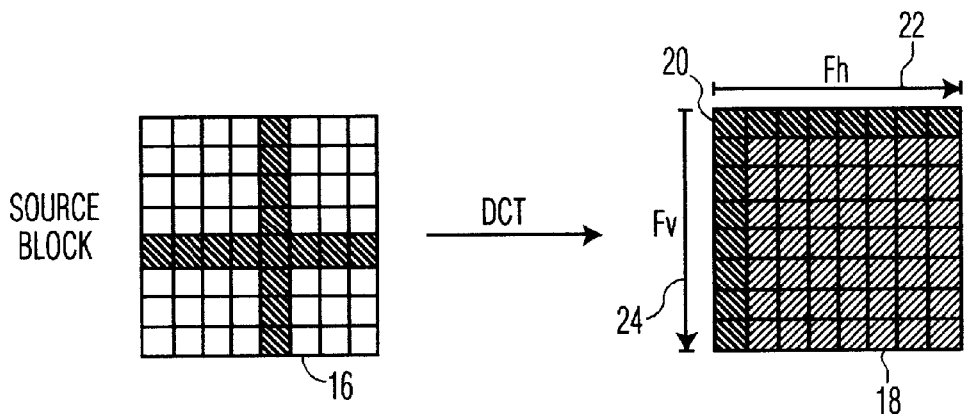
FIG. 2 is a diagram illustrating the DCT transform.
Figure 3:
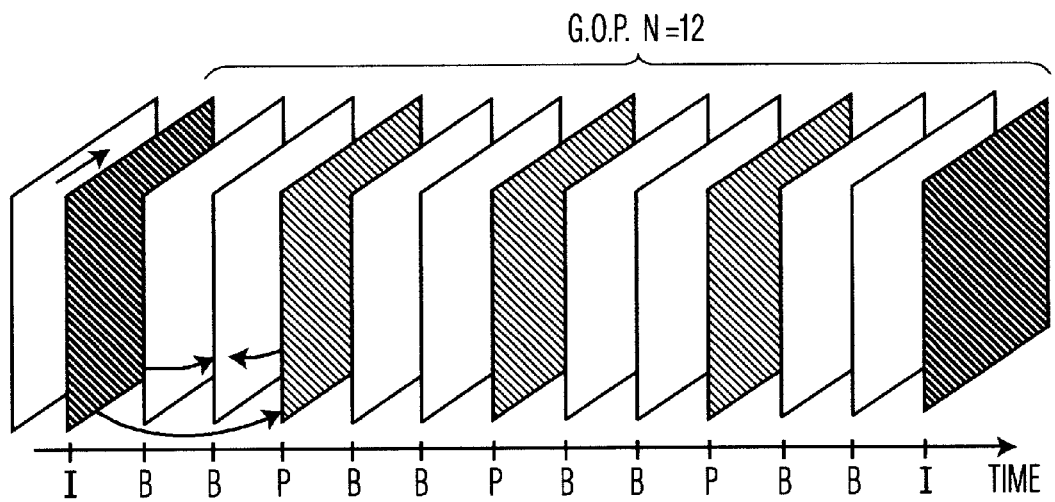
FIG. 3 shows a group of images, GOP, according to the MPEG standard or similar standard.

Reference will be made firstly to FIGS. 1 to 3 which aim to reiterate certain principles used in MPEG2 coding.

In the MPEG2 standard, a start point may be an image including, in progressive mode, 576 lines each of 720 points. In interlaced mode, this image consists of two frames each of which comprises 288 lines, each also of 720 points.

Each image is broken down into macroblocks each of which is formed by a square of 16×16 luminance points. Each macroblock it thus formed of four square blocks of 8×8 luminance points. With each of these four luminance blocks, two chrominance blocks, each of which exhibits 8×8 points, are associated (in the 4.2.0 format), one of the blocks representing the colour difference signals Cr or red chrominance and the other block representing the colour difference signals Cb or blue chrominance. In the 4.2.2 format, with each luminance macroblock are associated four 8×8 chrominance blocks, two blocks for the blue chrominance and two blocks for the red chrominance. There also exists a 4.4.4 format for which each of the luminance and chrominance components each includes four 8×8 blocks.

Four 8×8 luminance blocks have been represented in FIG. 1, referred to overall as 10, and 8×8 chrominance blocks 12 and 14 for the respectively blue and red chrominances, the whole illustrating a macroblock to the 4.2.0 standard.

Each block is coded by using a transform denoted DCT which is a discrete cosine transform which makes it possible to transform a luminance block (for example) into a block of coefficients representing spatial frequencies. As can be seen in FIG. 2, the source block 16 is converted into a block 18 of 8×8 coefficients. The upper left corner 20 of the block 18 corresponds to the zero spatial frequencies (average value of the block) and, from this origin 20, the horizontal frequencies increase to the right, as represented by the arrow 22, while the vertical spatial frequencies increase starting from the top downwards, as represented by the arrow 24.

For each macroblock, the type of coding has to be chosen: either "intra", or "inter". Intra coding consists in applying the DCT transform to a source block of the image, while inter coding consists in applying the DCT transform to a block representing the difference between a source block and a predicted block, or prediction block, of a preceding or following image.

The choice depends partly on the type of images to which the macroblock belongs. These images are of three types: the first type is the type known as 1, or intra, for which the coding is intra for all the macroblocks.

The second type is of P or prediction type; in this type of images, the coding of each macroblock may be either intra or inter. In the case of an inter coding over a P-type image, the DCT transform is applied to the difference between the current macroblock of this P image and a prediction macroblock arising from the preceding I or P image.

The third type of images is called B or bidirectional. Each macroblock of such a type of image is coded either in intra, or coded in inter mode. The inter coding also consists in applying the transform to the difference between the current macroblock of this B image and a prediction macroblock. This prediction macroblock may arise either from the preceding image or from the following image or both at once (bidirectional prediction), the prediction images called preceding or following only being able to be of I or P type.

A set of images has been represented in FIG. 3, forming a group called the GOP ("Group Of Pictures") which comprises 12 images, namely an I image followed by 11 B and P images according to the following sequence: B, B. P, B, B. P, B, B, P, B, B.

A GOP is characterised by a length, that is to say a number of images N which, in one example, may lie only between 12 and 30, and by a structural parameter M representing the distance between two P images, that is to say the number of B images between two successive P images, increased by one unit. In this example, this parameter M is equal to 3. Also by way of example, this number M may lie between 1 (no B image) and 7. Moreover, it is stipulated that this number M be a sub-multiple of the number N in order to simplify the coder.

Up to the present, images have been coded while keeping N and M constant in the coder.

The invention results from the observation that optimal values of M and of N exist which differ according to the sequences of coded images. This is because, depending on whether the image sequences present a greater or lesser definition and a more or less significant movement, the optimal values of M and of N may differ significantly. By optimal values is understood to be those which, for the same quality, require a minimum number of bits.

Figure 4:
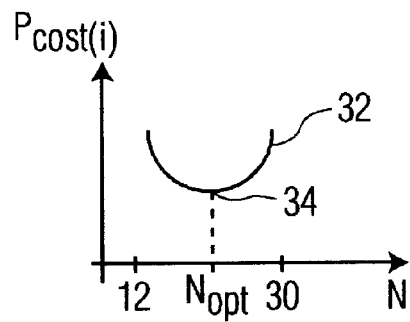
FIGS. 4 to 7 are diagrams illustrating the method in accordance with the invention.

On top of that, experimental studies carried out in the context of the invention have shown that the optimal size Nopt of the GOP for a defined sequence of images corresponds to the minimum value Pcost, over this sequence, of the number of bits which it is necessary to use to code the P images (headers included). This property is illustrated by the diagram of FIG. 4 on which has been plotted, on the abscissa, the number N and, on the ordinate, the value Pcost for a sequence denoted i. This value Pcost is the number of bits to be used to code a P image in average value over the sequence i. It is seen, thus, that the value Pcost (i) is represented by a curve 32 exhibiting a minimum 34 for which the value of N is optimal (Nopt).

Figure 5:
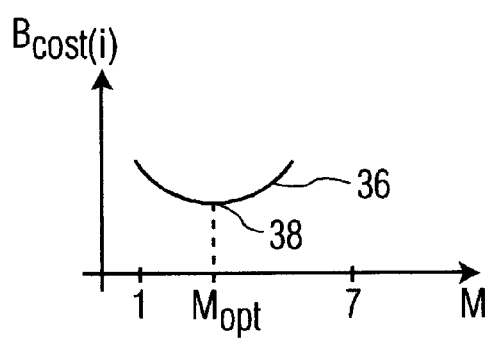

In a similar way, it was noted that the optimal value of the number M corresponds to the minimum Bcost (i) of the number of bits to be used on average to code the B images over a defined sequence, denoted i. Hence, on the diagram of FIG. 5, the number M has been represented on the abscissa and the number Bcost(i) has been plotted on the ordinate. It is seen on this diagram that the curve 36 exhibits a minimum 38 corresponding to the optimal value of M (Mopt).

Measurements have been taken, particularly on test sequences which are conventional in MPEG coding denoted "Horse", "Flower garden" and "Mobcal". The "Horse" sequence corresponds to rapid movements with good definition, the "Flower garden" sequence also corresponds to good definition and average movements, while the "Mobcal" sequence corresponds to little movement and high definition. Other sequences have also been tested, such as a kayak sequence with rapid movements and little definition, a basket sequence and a sequence with average, uniform movements and images with good definition.

Figure 6:
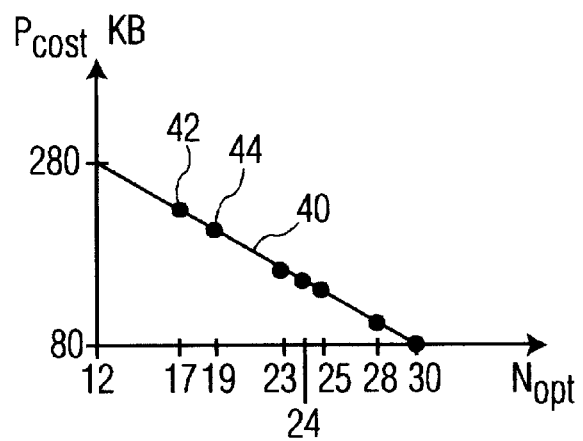

It has also been noted that, if the group is subjected to test coding with defined values of M, N and of the quantisation interval Q, these values not necessarily corresponding to the optimal values of the sequence i in question, the average cost of coding the P images Pcost and average cost of coding the B images Bcost represent N and M respectively. Moreover, as FIG. 6 shows, a simple relationship exists between the Nopt numbers for each sequence i and the coding cost Pcost at a given M, N and Q. This relationship is linear or substantially linear, being represented by a straight line 40 (FIG. 6) on which different points 42, 44, etc. represent different sequences.

Figure 7:
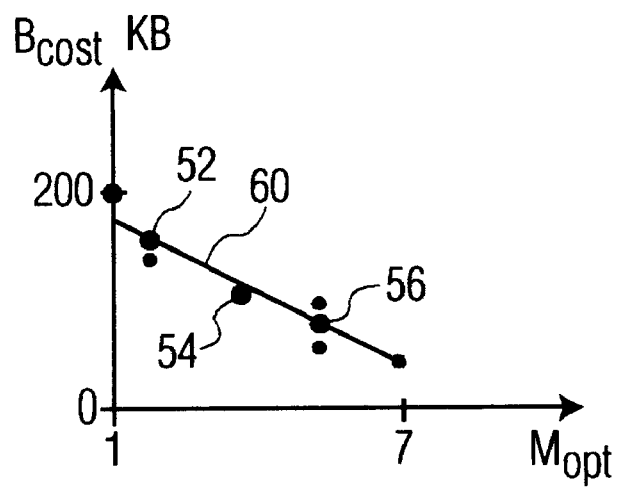

FIG. 7 is a diagram in which the Nopt numbers are plotted on the abscissa and the coding cost Pcost (with M, N and Q defined) is plotted on the ordinate; each point 52, 54, 56, etc. corresponds to a given sequence. It is seen that these points lie on a straight line 60. There is therefore a linear relationship between Nopt and the cost of the test coding.

When the values of M, N and Q used in the course of the test coding are as follows:

M=12,
N=3, and
Q=15, the values of M and N satisfy the following relationships:

$$N = \text{INT}\left[\frac{389000 - Pcost}{10000}\right] + 1, \text{ with } 12 \leq N \leq 30. \quad (1)$$

$$N = \text{INT}\left[\frac{179000 - Bcost}{20000}\right] + 1, \text{ with } 1 \leq M \leq 7. \quad (2)$$

Although, for formula (2) above, it has been indicated that M should lie between 1 and 7, it is seen on the diagram of FIG. 7 that in fact M may be limited to 5.

Figure 8:
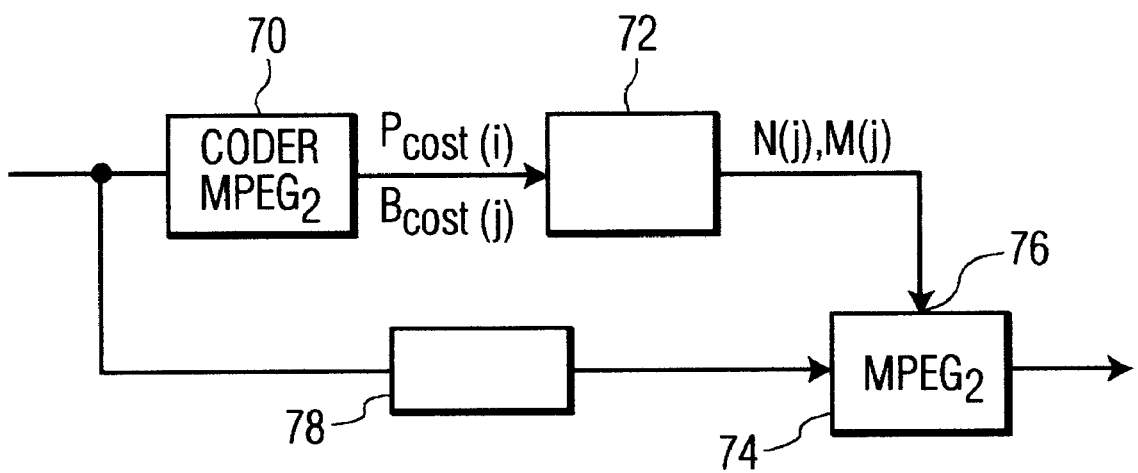
FIG. 8 is a diagram of a layout for implementing the method according to the invention.

The layout intended for implementing the invention is represented in FIG. 8. It comprises a first MPEG2 coder 70 intended to carry out the test coding or coding "first pass". This test coding is set up with the fixed parameters indicated above, namely, in this example: M=12, N=3 and Q=15. This test coder operates, in this example, in open loop, that is to say without regulation.

The coder 70 supplies the values Bcost and Pcost which are applied to a converter 72 which carries out the conversions of Pcost into Nopt and Bcost into Mopt, as represented in FIGS. 6 and 7 and in accordance with the relationships (1) and (2) above.

These values N and M are calculated for a group of images, as described above, and are then applied to a control input 76 of an MPEG2 coder 74.

The data at the input of the coder 74 are the same as those of the input of the test coder 70. Hence a buffer memory 78 is provided to take account of the processing time in the test coder 70 and in the converter 72, this memory 78 holding the data during the processing.

In the converter 72, it is also checked that the N, M pairs resulting from the formulae (1) and (2) are compatible with the constraints imposed in the embodiment, in particular that M is a sub-multiple of N. If the values resulting from the calculation are not compatible, values of N and of M are adopted which are closest to those which were calculated, favouring M values, however.

The converter 72 also takes account of supplementary conditions.

In the first place, it performs a comparison between Bcost and Pcost and, if Bcost is higher than Pcost, the value 1 is allocated to the number M, the GOP containing no B image. This is because, with this assumption, the B images entail a coding cost which is higher than the P images; it is preferable to keep only P images which exhibit a higher prediction quality.

In the second place, the converter compares Bcost with the value 179000 and, if Bcost exceeds 179000, relationship (2) above is replaced by the heuristic relationship below:

$$M = 5.\text{INT}\left[\frac{Pcost}{Bcost} - 1\right], \text{ with } 1 \leq M \leq 7. \quad (3)$$

The converter 72 also makes it possible to take account of two special cases for which it is necessary to depart from relationship (2) in order to obtain uniformity of image quality.

The first case is as follows: the test coding shows that M should exhibit a value at least equal to 2, but, moreover, this test coding also shows that the intermediate values obtained by M are equal to 1 over a large part of the group, for example at least 80%. In this case, the converter 72 stipulates that M be equal to 1.

The second case is similar to the first one: the test coding shows that M should be at least equal to 2, but the intermediate values obtained for M are equal to 1 for least a part of the length of the group, for example 60% (this limit is below the limit anticipated in the first case), and the preceding group is such that M=1. In this case, the value 1 is also conferred on the number M.

These two special cases, for which the value 1 is set for M, result from tests carried out in the context of the invention which have shown that these conditions allow a good uniformity of quality, for the same type of sequence, over successive groups.

Finally, the converter 72 takes account of the changes of scene or "cuts" which are usually detected in the coders. When such a change of scene occurs, the GOP is started with the new scene, that is to say that, when the new scene appears, it is attributed an Intra I image.

Moreover, with the method of the invention, when a change of scene is detected, the preceding GOP and the current GOP are configured on the basis of the following considerations:

if the change of scene appears in a GOP after the twelfth image, the new GOP then starts with the change of scene, the preceding GOP thus being limited or shortened.

if, in contrast, the change of scene appears before the twelfth image, it is not then possible to limit the preceding GOP so that it terminates just before the change of scene, since, in this case, its number of images would be less than the minimum number stipulated. The preceding GOP and the current GOP are then modified in the following way, two cases being distinguished.

In the first case, the change of scene appears at a moment such that the sum of the number of images of the preceding GOP and of the number of images of the current GOP, just before the change of scene, is at least equal to 30. In this case, the preceding GOP is lengthened.

In the second case, the sum of the number of images of the preceding GOP and of the number of images of the current GOP just before the change of scene is greater than 30. The preceding GOP and the current GOP are then rearranged by calculating an average corresponding to these two GOPs.

For example, if the preceding GOP is such that N=25 and M=2 and if the change of scene occurs after the eighth image of the current GOP for which the calculation indicates N=20 and N=3, the preceding GOP, lengthened by the current shortened GOP includes 33 images. As this value exceeds the maximum allowable (30), an "average" is sought corresponding to two GOPs the total number of images of which is 33, each of the GOPs having to comply with the constraints imposed. In this case, it is seen that a choice can be made between N=18 and M=2 for the preceding GOP and N=15 and M=3 for the GOP just before the change of scene. The lengths 18 and 15 are close to the average (16, 5) of the length of the preceding group (25) and of the length (8) of the affected current group.

Test have been carried out on twelve different sequences with changes of scene, flashes of light and relatively lengthy durations, and the results obtained with a conventional method of coding, corresponding to fixed values of M and of N have been compared to the results obtained with the method according to the invention which adapts the values of M and of N to sequences. These tests were carried out with several through-puts. An increase in quality was noted, measured by the PSNR parameter (Peak Signal to Noise Ratio), of 0.2 dB to 1.14 dB. This increase in PSNR corresponds to a saving in terms of bits lying between about 2 and 22%.

The method according to the invention can be used for any type of video-image compression method in which I, P and B images are provided. It applies both to recording, in real time or off-line, as well as to transmission.

The method is not limited to the case in which the size of the GOP is determined before coding. It also applies when the parameters M and N are calculated for each image, the coding proper being carried out on the fly. In this case, the number M may vary within a GOP, a new GOP starting, for example, when the number of images coded in the current GOP is at least equal to the calculated number N. The number M may vary as a function of the complexity of the images within a GOP.

In this case, it is not necessary to store the whole of the GOP in the buffer memory 78 (the capacity of which may be reduced), the constraints on the values of M and N are reduced, being dictated solely by the MPEG2 standard; the constraints imposed upon changes of scene are also less severe.

What is claimed:

1. Method of image compression in which the images are coded according to groups (GOPs) each of which comprises a number N of images, N representing the length of the group, which includes an I image coded in intra mode, P images predicted on the basis of the intra image I or of a preceding P image, each P image being preceded and followed by n bidirectionally predicted images B, n possibly being zero, the number M, which is equal to the number n increased by one unit, representing the structure of the group, wherein at least one parameter is determined characterizing the source images which are to be coded according to a group and wherein the length N and the structure M of the group are made to depend on this parameter or these parameters.

2. Method according to claim 1, wherein the parameter(s) characterizing the source images is or are determined with the aid of a test coding in the course of which defined values are allocated to N, M and to the quantisation interval Q.

3. Method according to claim 2, wherein the test coding is carried out in open loop.

4. Method according to claim 2, wherein, in order to characterize the source images, a first parameter (Pcost) characterizing the P images obtained during the test coding and a second parameter (Bcost) characterizing the B images obtained during the test coding are determined.

5. Method according to claim 4, wherein the number N is determined on the basis of said first parameter characterizing at least one P image, and wherein the number M is determined on the basis of said second parameter characterizing at least one B image.

6. Method according to claim 4, wherein the parameters (Pcost, Bcost) characterizing the P and B images are the costs of coding the P and B images.

7. Method according to claim 5, wherein, when the average cost (Bcost) of coding each B image is, in the course of the test coding, higher than the average cost (Pcost) of coding each P image, the value 1 is conferred on the number M, the group thus containing no B image.

8. Method according to claim 6, wherein, in the course of the test coding, the cost of coding each B image and the corresponding number M are determined in step with the arrival of the source images.

9. Method according to claim 8, wherein, when the M numbers determined before the end of the test coding are equal to 1 for a significant fraction of the group, the value 1 is conferred on the number M for the group.

10. Method according to claim 8, wherein, when the M numbers determined before the end of the test coding are equal to 1 for at least a defined fraction of the group, and when the number M is equal to 1 for the preceding group, the value 1 is conferred on the number M for the group.

11. Method according to claim 1, wherein, in the event of a change of scene occurring in a group, the new scene constitutes the I image of a new group, the affected group being shortened so as to stop be fore this new scene if the change of scene occurs in the affected group, at a distance from the start at least equal to the minimum number allowable for N, the start of the affected group being used to lengthen the group which precedes it when the sum of the number of images preceding the change of scene in the affected group, and of the number of images of the group which precedes it does not exceed the maximum admissible for N.

12. Method according to claim 1, wherein, in the event of a change of scene occurring in a group, the new scene constitutes the I image of a new group, the affected group and group which precedes it being rearranged so that each exhibits a length close to the average of the length of the group after alteration and of the group which precedes it.

13. Method according to claim 6, wherein, with the test coding being carried out according to an MPEG-type standard at 50 Hertz, with N=12, M=3 and Q=15, the numbers N and M are a function respectively of the average costs of coding B and P images according to the following relationships:

$$N = \text{INT}\left[\frac{389000 - Pcost}{10000}\right] + 1, \text{ with } 12 \leq N \leq 30 \quad (1)$$

$$N = \text{INT}\left[\frac{179000 - Bcost}{20000}\right] + 1, \text{ with } 1 \leq M \leq 7, \quad (2)$$

INT signifying integer part.

14. Method according to claim 13, wherein $1 \leq M \leq 7$.

15. Method according to claim 13, wherein, when the cost of coding (Bcost) is greater than 179000, the number M is determined by the following relationship:

$$M = 5.\text{INT}\left[\frac{Pcost}{Bcost} - 1\right], \text{ with } 1 \leq M \leq 7. \quad (3)$$

16. Method according to claim 1, wherein the number M is made to vary within a group.

17. Method according to claim 2, wherein the compression is carried out after the test coding.

18. Method according to claim 4, wherein the compression starts after said second parameter characterizing the first B image or said first parameter characterizing the first P image has been determined.

19. Method according to claim 18, wherein the formation of a coded group of pictures is interrupted when its number of coded images is at least equal to the number N determined on the basis of the current P image.

20. Coding device for implementing the method according to claim 4, wherein it includes a channel for carrying out the test coding and determining the M and N parameters and a coding channel (78, 74) receiving the information from the first channel so as to carry out the coding proper.

* * * * *